United States Patent
Hines et al.

(10) Patent No.: US 9,367,682 B1
(45) Date of Patent: Jun. 14, 2016

(54) CONTENT MANAGEMENT SYSTEM FOR SECURELY MANAGING STATIC AND DYNAMIC DATA CONTENT

(75) Inventors: Steven Keith Hines, San Francisco, CA (US); Dan Sanderson, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 1046 days.

(21) Appl. No.: 13/360,171

(22) Filed: Jan. 27, 2012

Related U.S. Application Data (60) Provisional application No. 61/570,480, filed on Dec. 14, 2011.

(51) Int. Cl.
*G06F 15/173* (2006.01)
*G06F 21/53* (2013.01)

(52) U.S. Cl.
CPC ..................................... *G06F 21/53* (2013.01)

(58) Field of Classification Search
CPC ...... G06F 21/53; G06F 3/0484; H04L 69/329
See application file for complete search history.

(56) References Cited

U.S. PATENT DOCUMENTS

| 7,308,648 B1* | 12/2007 | Buchthal | G06F 17/30896 704/10 |
| 8,370,938 B1* | 2/2013 | Daswani | G06F 21/562 726/23 |
| 2006/0253578 A1* | 11/2006 | Dixon | G06Q 10/06 709/225 |
| 2011/0289556 A1* | 11/2011 | Pieczul | G06F 21/53 726/3 |
| 2012/0084641 A1* | 4/2012 | Chung | G06Q 30/0241 715/240 |

* cited by examiner

*Primary Examiner* — Kevin Bates
*Assistant Examiner* — Dae Kim
(74) *Attorney, Agent, or Firm* — Lowenstein Sandler LLP (57) ABSTRACT

A computer-implemented method manages data content, the data content including static data and dynamic data. The content management method includes analyzing the data content by a server to identify the static data and the dynamic data within the data content, wherein the dynamic data is included within a content block, and extracting the dynamic data in the content block from the data content, and replacing the content block with a special identifier. The content management method further includes hosting, by the server, the data content with the static content and the special identifier from a primary website in a primary domain, and the dynamic data in a secondary website in a secondary domain, wherein the special identifier identifies a location of the dynamic data.

16 Claims, 6 Drawing Sheets

```
sssssss ssssssssssssssssss
ssssss ssssssssssssssssssss      ⎤
ssssss ssssssssssssssssssss      ⎬  201
                                 ⎦

┌─────────────────────────┐      ⎤
│ ddddddddddddddddddd     │      ⎬  202
│ dddddddddddddddddddd    │      ⎦
└─────────────────────────┘ sssssss ssssssssssssssssss       ⎤
sssssss sssssssssssssssssss      ⎬  203
sssssss ssssssssssssssssssss     ⎦
```

FIG. 2

```
┌───────────────────────────────┐   ⎤
│ ssssssssssssssssssssssssssss  │   ⎬  301
│ ssssssssssssssssssssssssssss  │   ⎦
└───────────────────────────────┘

┌───────────────────────────────┐   ⎤
│  ddddddddddddddddddd          │   ⎬  302
│  ddddddddddddddddddd          │   ⎦
└───────────────────────────────┘

┌───────────────────────────────┐   ⎤
│ sssssssssssssssssssssssssss   │   ⎬  303
│ sssssssssssssssss ssssssssss  │   ⎦
└───────────────────────────────┘
```

FIG. 3

```
sssssss ssssssssssssssssss      ⎤
sssssss ssssssssssssssssssss    ⎬  401
sssssss ssssssssssssssssssss    ⎦ dddddddddddddddddddd            ⎤
dddddddddddddddddddd            ⎬  402
dddddddddddddddddddd            ⎦ sssssss sssssssssssssssssss     ⎤
ssssss sssssss ssssssssssssss   ⎬  403
sssssss ssssssssssssssssssss    ⎦
```

CONTENT MANAGEMENT SYSTEM FOR SECURELY MANAGING STATIC AND DYNAMIC DATA CONTENT

CLAIM FOR PRIORITY

This application claims the priority benefit of U.S. Provisional Application No. 61/570,480, filed Dec. 14, 2011, the contents of which is expressly incorporated by reference in its entirety.

TECHNICAL FIELD

The present disclosure relates to the technical field of secure data content management using a content management system, wherein the data content includes both static and dynamic data.

BACKGROUND

Content data in computer systems often include both static and dynamic data. Static data, such as text, is normally secure and seldom presents a significant security risk. Dynamic data, such as executable programming code, presents a serious security risk, and is frequently used maliciously as a vehicle to compromise the security of a computer system in which the programming code is executed.

Due to the different security risks involving static data and dynamic data, data content that contains both static data and dynamic data raises complex security issues. Managing these complex security issues requires that proper consideration be given to both the overall security of the computer system and the impact on a computer system user of such data content.

SUMMARY

The present disclosure relates the technical field of secure data content management using a content management system, wherein the data content includes both static and dynamic data.

In an embodiment, a computer-implemented method manages data content, the data content including static data and dynamic data. The method includes analyzing the data content by a server to identify the static data and the dynamic data within the data content, wherein the dynamic data is included within a content block, and extracting the dynamic data in the content block from the data content, and replacing the content block with a special identifier. The method further includes hosting, by the server, the data content with the static content and the special identifier from a primary website in a primary domain, and the dynamic data in a secondary website in a secondary domain, wherein the special identifier identifies a location of the dynamic data.

In another embodiment, the dynamic data comprises executable programming code.

In a further embodiment, the executable programming code includes JavaScript®.

In an embodiment, the special identifier is an iFrame element.

In another embodiment, the primary website in the primary domain includes sensitive information, and the secondary website in the secondary domain does not include sensitive information.

In a further embodiment, the method includes executing the dynamic data hosted in the secondary website in the secondary domain.

In an embodiment, the method includes displaying on a display the data content that has been recombined, with the static data and the special identifier hosted in the primary website in the primary domain, together with the dynamic data hosted in the secondary website in the secondary domain.

In another embodiment, the use of the primary website in the primary domain and the use of the secondary website in the secondary domain are undetectable on the display.

In a further embodiment, the dynamic data is contained within a plurality of content blocks.

In an embodiment, the method further includes storing the static data and the special identifier as a first file in a first storage area, and the extracted dynamic data as a second file in a second storage area.

In another embodiment, the different types of dynamic data include different levels of security associated with the different types of dynamic data.

In still another embodiment, the first file is published to a first website at a first URL, and the second file is published to a second website at a URL corresponding to the special identifier in the first file.

In a further embodiment, a non-transitory computer-readable storage medium includes at least one executable computer program for managing data content, the data content including both static data and dynamic data. The medium includes an analyzing segment for analyzing the data content by a server to identify the static data and the dynamic data within the data content, wherein the dynamic data is included within a content block. The medium also includes an extracting segment for extracting the dynamic data in the content block from the data content, and replacing the content block with a special identifier. The medium further includes a hosting segment for hosting, by the server, the data content with the static content and the special identifier from a primary website in a primary domain, and the dynamic data in a secondary website in a secondary domain, wherein the special identifier identifies a location of the dynamic data.

In another embodiment, a computer-implemented server manages data content, the data content including both static data and dynamic data. The server includes at least one processor that analyzes the data content to identify the static data and the dynamic data within the data content, wherein the dynamic data is included within a content block. The at least one processor also extracts the dynamic data in the content block from the data content, and replaces the content block with a special identifier. The at least one processor further hosts the data content with the static content and the special identifier from a primary website in a primary domain, and the dynamic data in a secondary website in a secondary domain. The server also includes a memory that stores the static data and the special identifier as a first file in a first storage area, and storing the extracted dynamic data as a second file in a second storage area.

DETAILED DESCRIPTION

In view of the foregoing, the present disclosure, through one or more of its various aspects, embodiments and/or specific features or sub-components, is thus intended to bring out one or more of the advantages as specifically noted below.

The present disclosure relates to the field of secure data management using a content management system. Providing security of data content, which for example may be included in an electronic document, requires special considerations when the data content includes both static data and dynamic data. A first data type, such as static data includes, but is not limited to, various types of data including such as text and markup. A second data type, such as dynamic data includes, but is not limited to, executable programming code. Examples of executable programming code would include script, such as JavaScript, CSS, HTML, etc. However, the disclosed process would also be applicable to other executable programming codes. Additionally, in some embodiments, the dynamic data may include some static data within the dynamic data. Nevertheless, similar security concerns exist in such an embodiment, and the process disclosed herein similarly applies in these instances. Furthermore, it is appreciated that the first and second data types may comprise any type of data or any combination of types of data, and is not limited to the disclosed embodiment.

Contributors to any particular data content may include more than one person. Frequently, many people electronically contribute to a particular data content from different locations using computing devices over one or more networks. Examples of such networks would include, but are not limited to, a local area network, a wide area network, and the Internet.

Sometimes one or more data content authors desire to demonstrate the behavior of their data content by using dynamic data, such as executable programming code. In these instances, data content authors frequently embed dynamic data within corresponding static data, such as descriptive text. This arrangement of both static data and dynamic data within one overall data content provided in an electronic document permits a user to both read the static data, such as a text description of the dynamic data, and execute the dynamic data, such as a demonstration of executable programming code that is embedded in the data content.

The inclusion of both static data and dynamic data in a data content, however, presents special security concerns. Generally speaking, static data such as text is relatively secure and presents a minimal security risk. On the other hand, dynamic data such as executable programming code is particularly vulnerable to security risks. For instance, a data content author may unknowingly introduce executable programming code that contains some form of existing security risk, or may introduce executable programming code that is vulnerable to an attacker in the future. The execution of the programming code that contains some form of security risk may compromise all or part of the computing site, or may permit the attacker to gain access to sensitive information or private information of one or more users of the computing site. Such security risks may take one or more of many forms. Examples of security risks would include malware, viruses, trojan horses, spyware, and worms, etc.

Figure 1A:
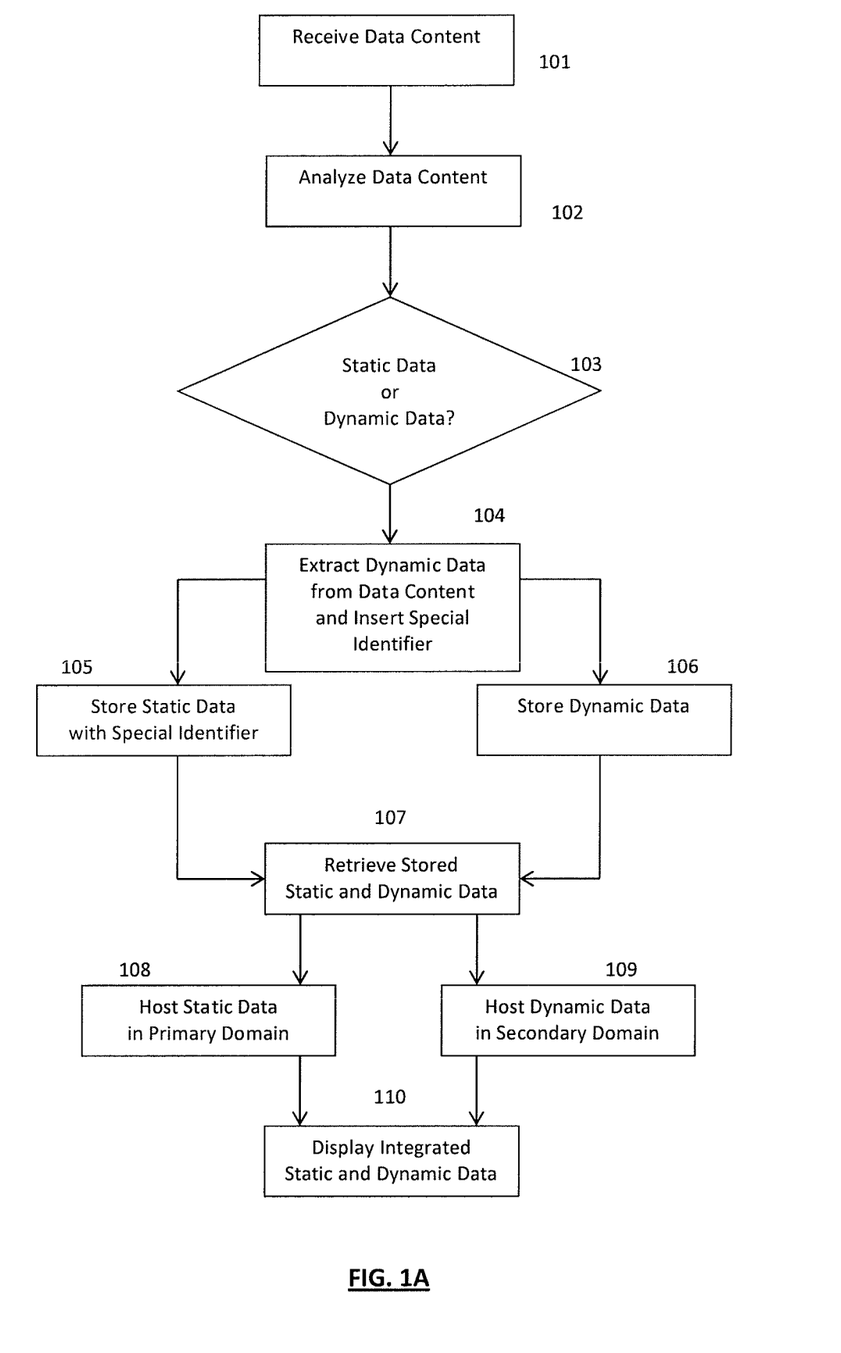
FIG. 1A illustrates an exemplary flowchart of a process for securely managing data content when the data content includes both static data and dynamic data.

FIG. 1A provides an illustration of an exemplary flowchart of a process for securely managing data content when the data content includes both static data and dynamic data. At 101, data content including both static data and dynamic data is received and entered into a computer system. The data content may be entered directly by a data input device or indirectly over a network, such as by a user entering data content at a client terminal. The client terminal may be located locally or at a remote location. The expression client terminal is not meant to be limiting, but is used to convey that the data content may be received from any form of computing device. Such computing devices may include desktop computers, laptop computers, netbook computers, electronic tablets, smart phones, personal digital assistants, etc.

At 102, the entered data content is electronically analyzed to determine what parts of the data content are static data and what parts of the data content are dynamic data, as illustrated at 103. This analysis may be performed in many different ways. For instance, the dynamic data may be included within a designated content block, where the content block is defined, for example, by strings at the beginning and the end thereof. During the analysis, a content management system (described below with reference to FIG. 5) identifies the content block within the data content. At 103, the content management system determines what part of the data content is static data and what part of the data content is dynamic data. At 104, the content management system extracts the dynamic data within the content block, and replaces the extracted dynamic data with a special identifier that identifies a location of the extracted dynamic data.

At 105 the static data and the special identifier are stored in a first storage area. At 106 the extracted dynamic data is stored in a second storage area. The actual location of the first storage area and the second storage area may take many forms. For instance, the first storage location and the second storage location may be stored in a common storage or in separate storages. Also, the first storage area and the second storage area may reside at different locations, such as on different servers that may or may not be located at a common physical location.

After data extraction, the content block that originally comprised dynamic data may comprise many forms. For instance, the dynamic content block may comprise an iFrame element that references the current location of the extracted dynamic data. An iFrame element provides separation of markup and executable programming code from the static data content. Prior to data extraction, the content block may be formed as regions or frameboxes. Frameboxes provide the inline appearance and the inline manageability of including the dynamic data content, such as executable programming code, within a documentation page having static data. Such frameboxes also provide the ability to facilitate the serving of the dynamic data, such as executable programming code, from a secondary website on a secondary domain.

At 107 the stored static data and the stored dynamic data are retrieved from storage. At 108 the static data is hosted by the content management system from a primary website in a primary domain. Similarly, at 109 the dynamic data is hosted by the content management system from a secondary website in a secondary domain. Hosting the static data from a primary domain and the dynamic data from the secondary domain provides a way to execute the dynamic data, such as executable programming code, while providing protection from any potential security threats or other vulnerabilities that may also be executed together with the dynamic data. The effect of this process is to host the dynamic data, such as executable programming code, in a secondary domain that is separate from the primary domain that hosts the static data, and that does not have any sensitive information or user information that may be vulnerable to security threats from an attacker. As a result, sensitive information and user information stored at the primary website and hosted in the primary domain are protected from being compromised by the execution of any security threats in the secondary domain. This is because programming code executed in the secondary domain cannot access the primary domain due to primary domain web browser security protocols. In other words, programming code served from the secondary domain is executed by the web browser in such a way that it cannot access data from the primary domain.

At 110 an integrated display of both the static data and the dynamic data is presented to a user. As described, this is accomplished by the special identifier associated with the static data file calling the special identifier in the dynamic data file. Due to the above-described process, the integrated display is seamless in that the hosting of the static data from the primary domain and the hosting of the dynamic data from the secondary domain are transparent to the user. The appearance is the same as if both the static data and the dynamic data were being hosted on the same domain.

Alternative implementations may include the use of JavaScript "vm" technology as Caja. This technology hosts executable programming code in an interpreter that can be instructed to block executing programming code from accessing designated external resources. Another alternative implementation would be for users to deploy code samples to a separate code host. The executable programming code would be published to a separate host, and then manually loaded into the data content with an identifier, such as an iFrame, specifying the location. A further implementation would be to subject executable programming code to a separate review process to analyze the executable programming code and to remove any malware contained therein and repair any security vulnerabilities prior to entering the dynamic data into the primary domain.

Figure 1B:
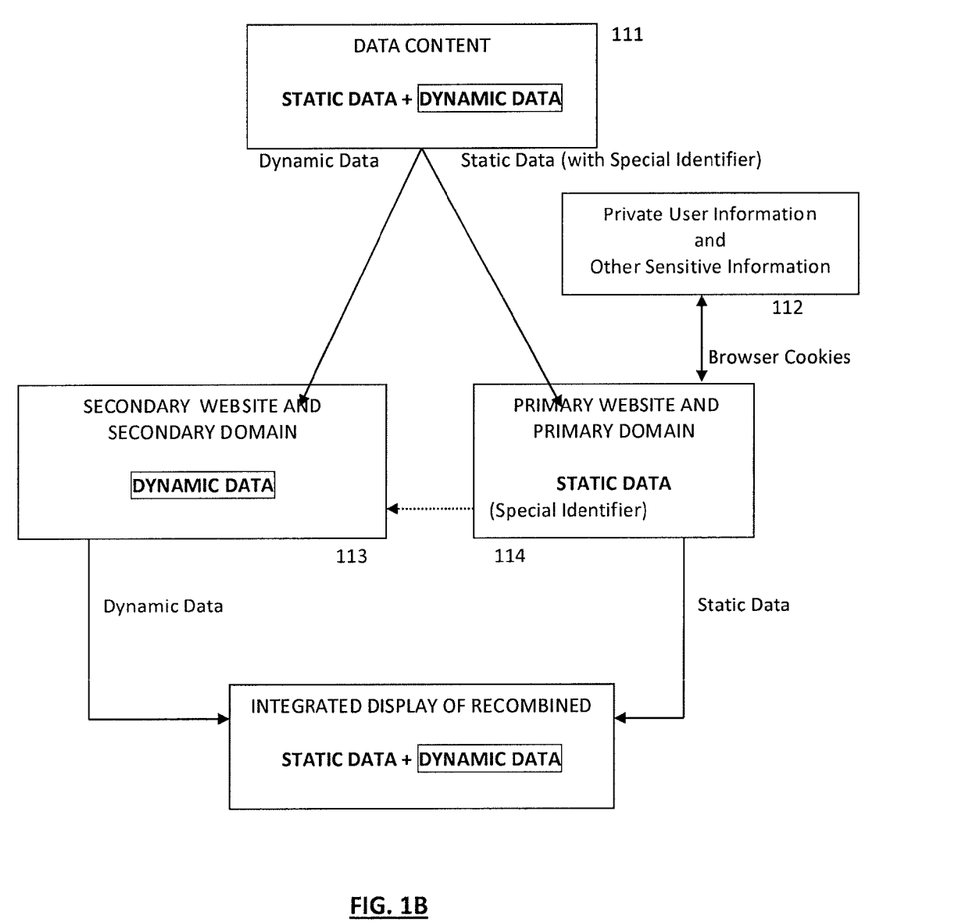
FIG. 1B illustrates an exemplary diagram of the process for securely managing data content when the data content includes both static data and dynamic data.

FIG. 1B illustrates an exemplary conceptual diagram of the process for securely managing data content when the data content includes both static data and dynamic data. The overall data content 111 includes both static data, and dynamic data provided in a content block. At 113, the dynamic data is extracted from the data content and is sent to a secondary website using a secondary domain. The content block that included the dynamic data in the data content is replaced with a special identifier, which are sent to a primary website using a primary domain at 114. The primary website utilizes selective private user information and/or other sensitive information in various browser cookies, as depicted at 112. Upon receiving a request to access or display the data content, the static data is accessed from primary website using the primary domain. Additionally, the dynamic data is accessed from the secondary website using the secondary domain, based upon receipt of the special identifier associated with the static data. At 115, an integrated display of the recombined static data and dynamic data is thus presented to a user in a seamless manner.

Figure 1C:
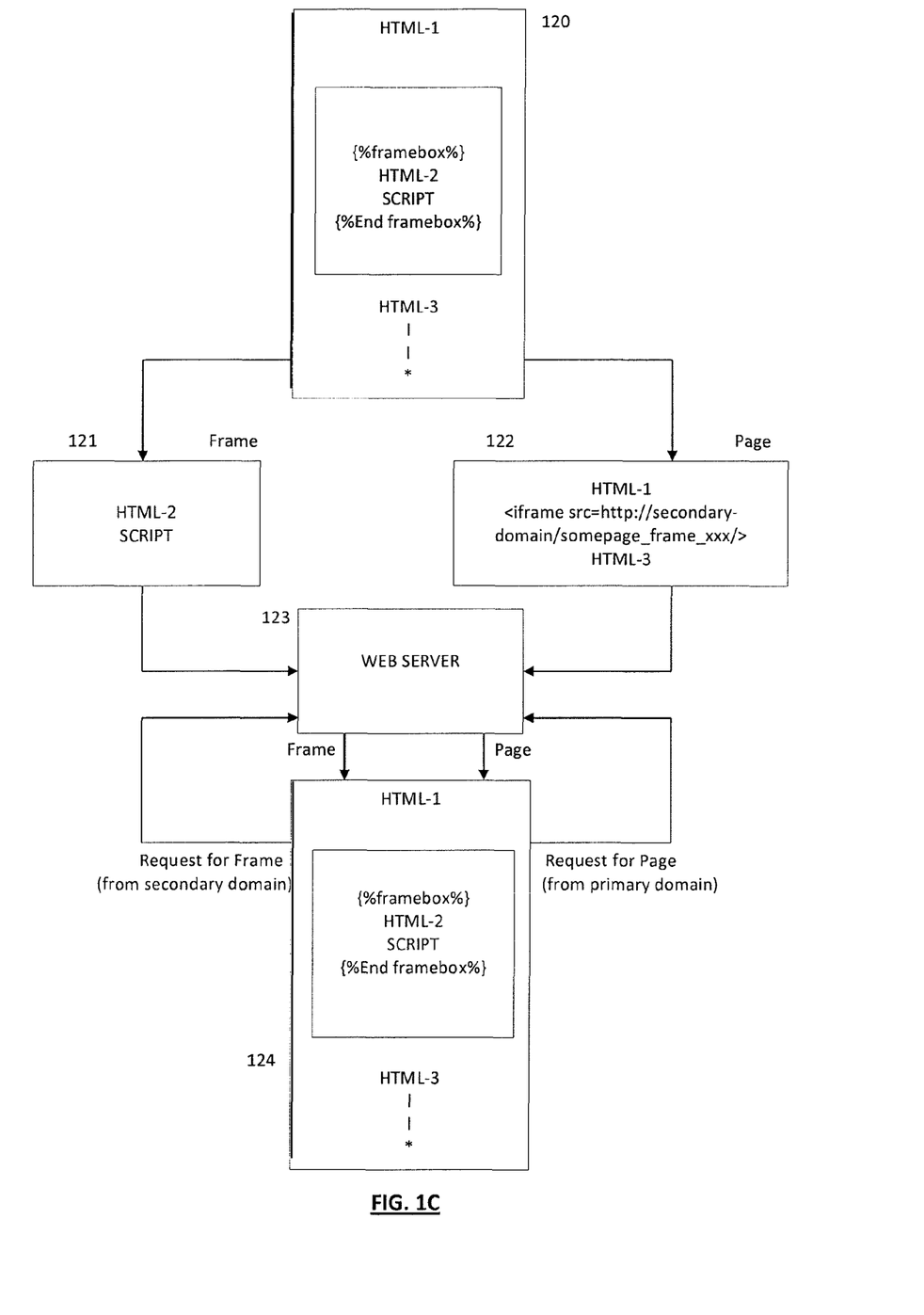
FIG. 1C illustrates an exemplary diagram of the process for securely managing data content when the data content includes both static data and dynamic data.

FIG. 1C illustrates an exemplary diagram of the process for securely managing data content when the data content includes both static data and dynamic data. In the example provided, content data 120 includes a first type of data (e.g. static data), such as HTML-1 and HTML-3 and a second type of data (e.g. dynamic data), such as HTML-2 and SCRIPT. Notably, the second type of data is "framed" with a beginning and ending string. In this example, the beginning string is {% framebox %} and the ending string is {% End framebox %}. The strings define a content block that includes the second type of data. As explained above, the control management system extracts the second type of data from the content data 120 by recognizing the beginning and end of the content block, and replaces the content block of the content data 120 with a special identifier, such as an iFrame. The content data which now includes HTML-1, HTML-3 and the special identifier (122) is stored (or published) at a first domain for hosting by a web server 123. The extracted content block data includes HTML-2 and SCRIPT (121) is stored (or published) at a second domain for hosting by the web server 123. In one embodiment, the extracted content data also includes header and footer information. It is appreciated that although only a single web server 123 is depicted, the system is not limited to a single web server. Any number of servers may be provided.

When a user at a browser 124 requests a web page from a domain via web server 123, a web page including content data 122 stored at the first domain is returned to the user at the browser, and a request is automatically made to the web server 123 for the extracted content block located at the second domain using the special identifier provided in the content data 122. The extracted content block data 121 is returned to the browser 124 and seamlessly provided together with content data 122 and displayed using browser 124.

Figure 2:
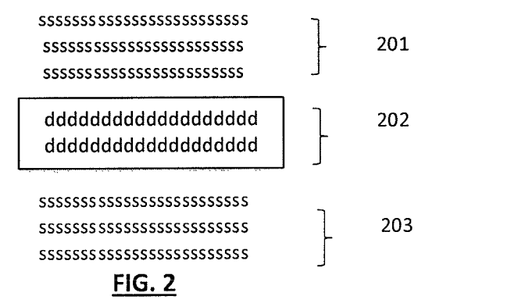
FIG. 2 illustrates an exemplary embodiment of content data with dynamic data being included within a content block.

FIG. 2 illustrates an exemplary embodiment of content data with dynamic data being included within a content block. In the content data (201, 202, 203) of FIG. 2, the letter "s" represents static data and the letter "d" represents dynamic data. As illustrated, static data 201 and 203 are content data not included in a content block or framebox. Content block 202, on the other hand, includes dynamic data, such as executable programming code. In this configuration, the data content management system identifies the content block 202 in the data content, extracts the dynamic data included therein, and replaces the content block with a special identifier. The special identifier, such as an iFrame tag, identifies the location where the extracted dynamic data is located.

Figure 3:
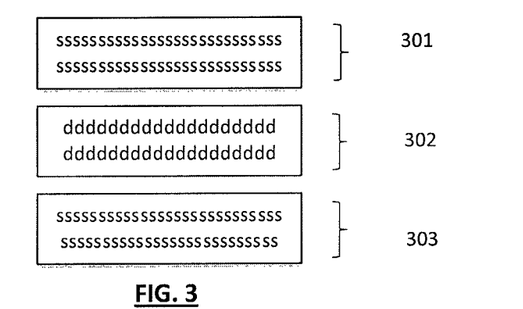
FIG. 3 illustrates an exemplary embodiment of content data with both static data and dynamic data each being included in separate content blocks.

FIG. 3 illustrates an exemplary embodiment of content data where all of the content data is contained in a plurality of content blocks. In this configuration, static data and dynamic data are included in separate data content blocks. In this configuration, the data content management system manages each data content block dependent upon the type of data that is stored therein. For instance, data content blocks are identified as static data content blocks or dynamic data content blocks. In FIGS. 3, 301 and 303 depict static data content blocks, whereas 302 depicts dynamic data content blocks. That is, in this example, the content data is divided into content blocks at the time of publication.

Figure 4:
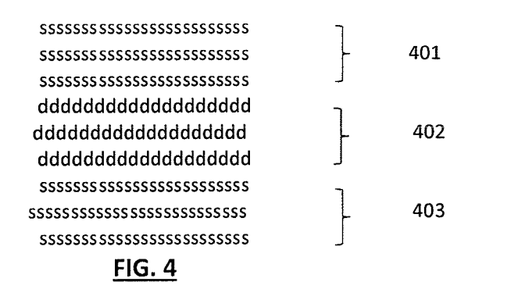
FIG. 4 illustrated an exemplary embodiment of content data where neither the static data nor the dynamic data is stored in content blocks.

FIG. 4 illustrates an exemplary embodiment of automatic content blocking of content data where neither the static data nor the dynamic data is stored in data content blocks. In this embodiment, the data content management system automatically uses artificial intelligence to distinguish among characters, symbols, expressions, text, data patterns, etc. included in the data content to determine what portions of the data content should be designated as static data and what portions of the data content should be designated as dynamic data. The computer program providing the artificial intelligence to distinguish among characters, symbols, expressions, text, and data patterns, etc., included in the data content are conventional in nature and are known to those skilled in the relevant art. Thus, a description of such conventional computer programs is not provided herein.

Data content determined to be dynamic data is then isolated by the data content management system in a virtual dynamic content block and is separated from the static data in the data content. The virtual dynamic content block is then treated similarly to that described above, wherein the virtual content block is replaced with a special identifier and is hosted on a secondary domain, which is isolated from the static data hosted in the primary domain. In FIG. 4, content data 401 and 403 depict static data, whereas virtual dynamic content block 402 depicts dynamic data.

Other alternative implementations envision including dynamic data in a plurality of data content blocks. One or more of the plurality of content blocks may be hosted on one or more different domains dependent upon characteristics of the dynamic data included in a dynamic data content block. For instance, the characteristic may relate to such factors as the type of the dynamic data, the origin of the dynamic data, the form of the dynamic data, and the security risk of the dynamic data, etc.

Figure 5:
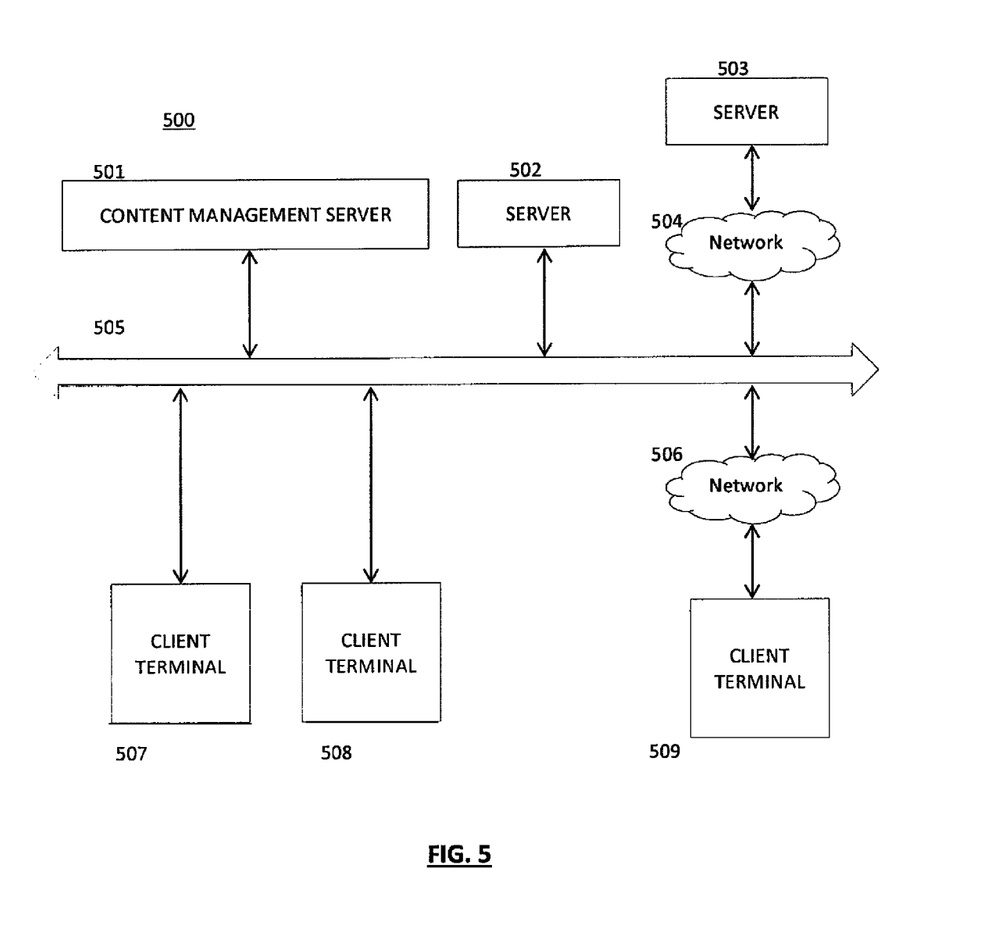
FIG. 5 illustrates an exemplary Content Management System, which may be used to implement the process disclosed herein.

FIG. 5 illustrates an exemplary Content Management System 500, which may be used to implement the process described above. The illustrated Content Management System 500 includes a Content Management Server 501 includes a processor to process received data content, which includes both static data and dynamic data. In this exemplary non-limiting embodiment, the data content is received from bus 505 from one or more of client terminals 507, 508, and 509. As illustrated, client terminals 507 and 508 are directly connected to bus 505, whereas client terminal 509 is connected to bus 505 through a network 506.

The Content Management Server 501 analyzes the data content to identify the static data and the dynamic data within the data content, wherein the dynamic data is included within a content block. The Content Management Server 501 replaces the dynamic data in the content block with a special identifier. The static data with the special identifier is stored in a first storage area, whereas the dynamic data is stored in a second storage area. The first storage area and the second storage area may be included in one or more storages within the Content Management Server 501, or may be stored in separate servers, or in any location accessible by the Content Management System 500. For instance, in addition to the Content Management Server 501, FIG. 5 also illustrates server 502 directly connected to bus 505 and server 503 connected to bus 505 via network 504.

The static data and the special identifier are hosted from a primary website in a primary domain, whereas the dynamic data is hosted in a secondary website in a secondary domain. As a non-limiting example, Content Management Server 501 may host the static data from a primary website in a primary domain (e.g., first domain) such as server 502, wherein server 503 may host the secondary website in a secondary domain (e.g., non-first domain).

Upon receipt of an appropriate request from one or more of client terminals 507, 508, and 509, the Content Management Server 501 will cause the integrated static data and dynamic data to be displayed to one or more users in a seamless manner. Thus, the hosting of the static data and the dynamic data from two separate domains will not be apparent from the user display.

Figure 6:
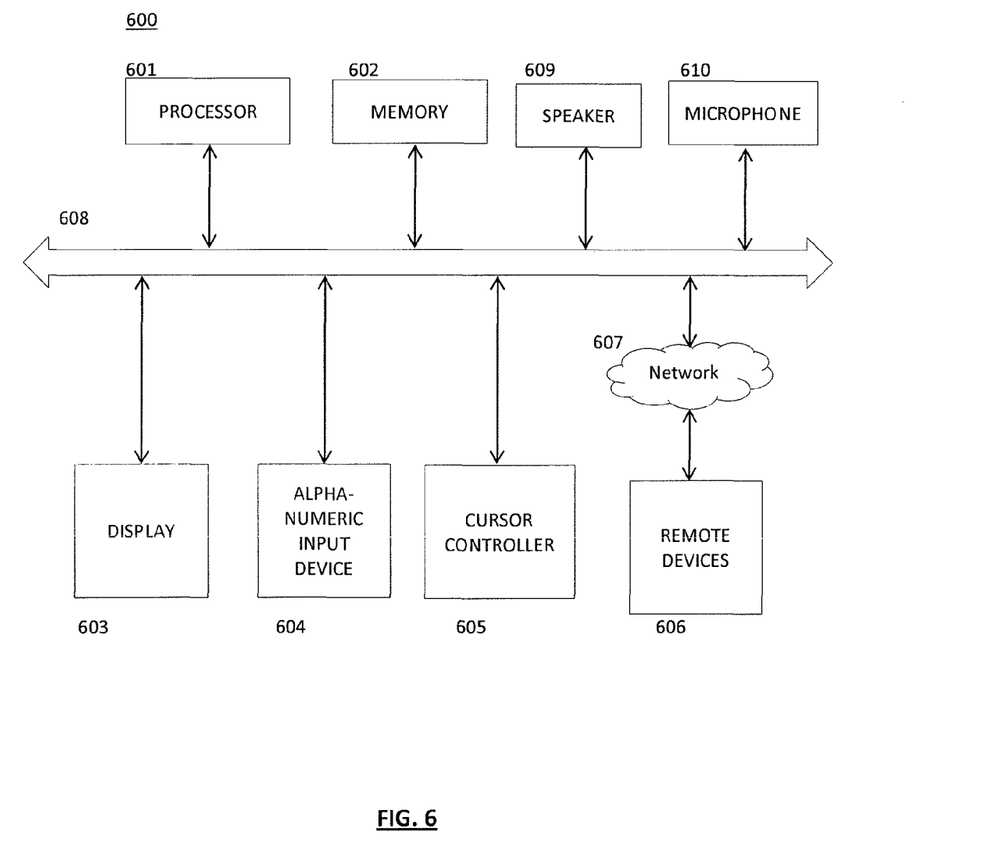
FIG. 6 illustrates an exemplary configuration of a general purpose computer, which may be used to implement the process disclosed herein.

FIG. 6 illustrates an exemplary configuration of a general purpose computer 600 on which the process described above may be implemented. The computer 600 includes one or more sets of computer programming instructions that are stored in memory 602 and that can be executed by processor 601 in computer 600 to perform the process described above. The computer 600 may be present in one of many physical configurations, including being configured as a server or as a client terminal. The computer 600 may also be included in various devices, such as a desk-top computer, a laptop computer, a personal digital assistant, a mobile device, an electronic tablet, a smart phone, etc.

As illustrated in FIG. 6, the computer 600 includes a processor 601 and memory 602, which is representative of one or more various memories that may be used by the computer 600. These memories may include one or more random access memories, read only memories, and programmable read only memories, etc. Computer 600 also includes at least one display 603, which may be provided in any form, including a cathode ray tube, a LED display, an LCD display, and a plasma display, etc. The display may include provisions for data entry, such as by including a touch-sensitive screen or by providing eye-movement detection technology. Additional output devices may include an audio output device, such as a speaker 609.

Computer 600 further includes one or more input devices. Input devices may include an alpha-numeric input device 604, such as a keyboard; a cursor controller 605, such as a mouse, touch-pad, or joy-stick; and a microphone 610. Computer 600 also enables processor 601 to communicate with one or more remote devices 606 over a network 607 external to computer 600. Communications internal to computer 600 primarily uses bus 608.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, by a processor of a server, a request by a client for data content;
   determining, by the processor, that the data content comprises a first content block contributed by a first author and a second content block contributed by a second author;
   identifying within the first content block, by the processor, a first portion of dynamic data and a first portion of static data;
   identifying within the second content block, by the processor, a second portion of dynamic data and a second portion of static data;
   extracting the first portion of dynamic data of the first content block from the data content, and replacing the first content block with an identifier;
   hosting the first portion of static content, the second portion of static content, and the identifier in a first domain;
   executing, by the processor, the first portion of dynamic data in a second domain based on an identity of the first author, and the second portion of dynamic data in a third domain based on an identity of the second author, wherein the second domain has a different level of security than the third domain; and
   transmitting to the client the first portion of static data, the second portion of static data, a result of the executed first portion of dynamic data contributed by the first author, and a result of the executed second portion of dynamic data contributed by the second author;
   wherein the identifier identifies a location of the first portion of dynamic data in the second domain.

2. The method according to claim 1, wherein the first portion of dynamic data comprises executable programming code.

3. The method according to claim 2, wherein the executable programming code includes at least one of JavaScript, CSS or HTML.

4. The method according to claim 1, wherein the identifier is an iFrame element.

5. The method according to claim 1, wherein the first portion of static data, the second portion of static data, the result of the executed first portion of dynamic data, and the result of the executed second portion of dynamic data are displayed by the client.

6. The method according to claim 1, further comprising:
storing, by the processor, the first portion of static data, the second portion of static data, and the identifier as a first file in a first storage area, the first portion of dynamic data as a second file in a second storage area, and the third portion of dynamic data as a third file in a third storage area.

7. A non-transitory computer-readable storage medium including instructions that when executed by a processor, cause the processor to:
receive, by the processor, a request by a client for data content;
determine, by the processor, that the data content comprises a first content block contributed by a first author and a second content block contributed by a second author;
identify within the first content block, by the processor, a first portion of dynamic data and a first portion of static data;
identify within the second content block, by the processor, a second portion of dynamic data and a second portion of static data;
extract the first portion of dynamic data of the first content block from the data content, and replace the first content block with an identifier;
host the first portion of static content, the second portion of static content, and the identifier in a first domain;
execute, by the processor, the first portion of dynamic data in a second domain based on an identity of the first author, and the second portion of dynamic data in a third domain based on an identity of the second author, wherein the second domain has a different level of security than the third domain; and
transmit to the client the first portion of static data, the second portion of static data, a result of the executed first portion of dynamic data contributed by the first author, and a result of the executed second portion of dynamic data contributed by the second author;
wherein the identifier identifies a location of the first portion of dynamic data in the second domain.

8. The non-transitory computer-readable storage medium according to claim 7, wherein the first portion of dynamic data comprises executable programming code.

9. The non-transitory computer-readable storage medium according to claim 8, wherein the executable programming code includes at least one of JavaScript, CSS or HTML.

10. The non-transitory computer-readable storage medium according to claim 7, wherein the identifier is an iFrame element.

11. The non-transitory computer-readable storage medium according to claim 7, wherein the first portion of static data, the second portion of static data, the result of the executed first portion of dynamic data, and the result of the executed second portion of dynamic data are displayed by the client.

12. The non-transitory computer-readable storage medium according to claim 7, wherein the instructions further cause the processor to:
store the first portion of static data, the second portion of static data, and the identifier as a first file in a first storage area, the first portion of dynamic data as a second file in a second storage area, and the third portion of dynamic data as a third file in a third storage area.

13. A server comprising:
a memory to store data content; and
at least one processor, operatively coupled to the memory, to:
receive a request by a client for the data content;
determine that the data content comprises a first content block contributed by a first author and a second content block contributed by a second author;
identify within the first content block a first portion of dynamic data and a first portion of static data;
identify within the second content block a second portion of dynamic data and a second portion of static data;
extract the first portion of dynamic data of the first content block from the data content, and replace the first content block with an identifier;
host the first portion of static content, the second portion of static content, and the identifier in a first domain;
execute the first portion of dynamic data in a second domain based on an identity of the first author, and the second portion of dynamic data in a third domain based on an identity of the second author, wherein the second domain has a different level of security than the third domain; and
transmit to the client the first portion of static data, the second portion of static data, a result of the executed first portion of dynamic data from the first author, and a result of the executed second portion of dynamic data from the second author;
wherein the identifier identifies a location of the first portion of dynamic data in the second domain.

14. The server according to claim 13, wherein the first portion of dynamic data comprises executable programming code.

15. The server according to claim 13, wherein the identifier is an iFrame element.

16. The server according to claim 13, wherein the first portion of static data, the second portion of static data, and the identifier are stored as a first file in a first storage area, the first portion of dynamic data is stored as a second file in a second storage area, and the third portion of dynamic data as a third file in a third storage area.

* * * * *